United States Patent Office 3,392,215
Patented July 9, 1968

3,392,215
PROCESS FOR PREPARING N - (BETA - DIALKYL-DITHIOPHOSPHORYLETHYL ARYL OR ALKYL SULFONAMIDES
Raymond A. Simone, Walnut Creek, and Llewellyn W. Fancher, Lafayette, Calif., assignors to Stauffer Chemical Company, New York, N.Y., a corporation of Delaware
No Drawing. Filed Oct. 12, 1964, Ser. No. 403,381
10 Claims. (Cl. 260—978)

ABSTRACT OF THE DISCLOSURE

A process for the preparation of N-(beta-diloweralkyl-dithiophosphorylethyl) aryl or alkyl sulfonamides by reacting a N-alkylsulfonyl- or N-arylsulfonyl-ethylenimine with diloweralkyldithiophosphoric acid or an aqueous solution of its alkali metal or ammonium salt and isolating the material produced thereby.

---

This invention relates to a process involving a new and novel reaction for the preparation of N-(beta-dialkyldi-thiophosphorylethyl) aryl or alkyl sulfonamides. In particular it refers to an improved process for preparing N-(beta-dialkyldithiophosphorylethyl) aryl or alkyl sulfonamides which comprises condensing an aryl or alkyl sulfonylethylene-imine with a dialkyldithiophosphoric acid or dialkyldithiophosphate alkali metal or ammonium salt.

The sulfonamides herein produced are valuable compounds. They find great utility as selective herbicides.

The current known methods of preparation of the sulfonamides of the present invention involve complex batch-wise operations. In general, an alkyl or aryl sulfonamidethyl halide, usually the chloride, is condensed with a dialkyldithiophosphate salt in the presence of promoters such as tertiary amines and dimethylformamide. The starting sulfonamidethyl halide is not easily prepared but requires several intermediate steps from a corresponding aryl or alkyl sulfonyl halide in order to arrive at a usable starting material. Such factors as the order of addition of reactants, necessity of dehydration between steps, and concentration of reactants all influence the ultimate quality and quantity of the sulfonamidethyl halide. Other methods of preparation which use more reactive intermediates, but are largely prohibited due to economic considerations, involve the use of alkyl or aryl sulfonamidethyl bromides or iodides in the condensation with a dialkyldithiophosphate salt.

A general object of the present invention is, therefore, to provide a new and improved process for preparing N-(beta-dialkyldithiophosphorylethyl) aryl or alkyl sulfonamides.

More specifically, an object of the invention is provision of a process for preparing said phosphorous-containing sulfonamides in a rapid and economical manner by a new and novel reaction eliminating the necessity of using the alkyl or aryl sulfonamidethyl halides.

Pursuant to the above-mentioned and yet further objects, it has been found that N-(beta-dialkyldithiophosphorylethyl) aryl or alkyl sulfonamides can be prepared by reacting an aryl or alkyl sulfonylethylenimine with a dialkyldithiophosphoric acid or an aqueous solution of its sodium, potassium or ammonium salt. The reaction can be represented by the following equations:

(1) 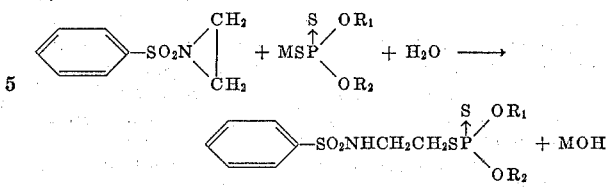

wherein M represents sodium, potassium or ammonium and $R_1$ and $R_2$ are lower alkyls. In the place of phenyl one can use halophenyl, lower alkyl-substituted phenyl, poly aryls as naphthyl radicals, lower alkyl, halo-lower alkyl, and the like, within the scope of the present invention as substituted-sulfonyl ethylenimines.

(2) 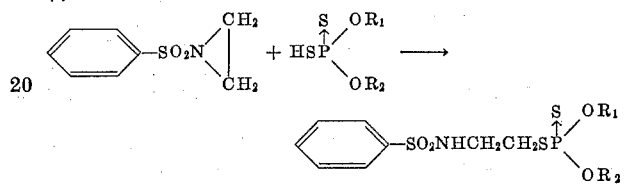

wherein $R_1$ and $R_2$ are lower alkyls. In Equation 2 wherein the free acid is used, the reaction need not be performed in the presence of an aqueous media.

Broadly considered, the nature of the alkyl or aryl substituent attached to the sulfur atom of the sulfonylimine may be of any carbon content and substitution to be included within the scope of the invention. It is only necessary that the compounds be stable in the presence of the solvents and reagents used and at the temperatures employed to carry out the reaction. Although the phenyl radical is represented in Equations 1 and 2, a substituted phenyl, an alkyl or substituted alkyl group will function equally well. Such examples as halophenyl, lower alkyl-substituted phenyl, poly-aryls as naphthyl radicals, alkyls as methyl, ethyl, propyl, butyl, halolower alkyl and the like, can be used in place of the phenyl radical shown in Equations 1 and 2.

The phosphorus-containing sulfonamides of the present invention most conveniently may be prepared by reacting the corresponding aryl or alkyl sulfonethylenimine with a corresponding dialkyldithiophosphate salt or its free acid as represented hereinbefore by Equations 1 and 2. The aryl or alkyl sulfonethylenimine may be prepared by the direct reaction of ethylenimine and the corresponding aryl or alkyl sulfonyl chloride in the presence of a hydrogen halide acceptor. The product therein produced can be reacted directly with or without isolation, with the desired dialkyl-dithiophosphoric acid or alkali metal salt.

The ring-opening reaction is generally conducted with two phases present. An organic phase, usually benzene or toluene, is employed as a solvent for the aryl or alkyl sulfonylethylenimine and subsequently as a solvent for the final condensation product. An aqueous phase is employed as a solvent for introducing the dialkyldithiophosphate salt. When the free acid is used there is no need for an aqueous phase, although a highly polar phase is desirable in this instance. Changes in solvents will affect reaction rates much in the same way as they affect equilibria conditions. It should be noted that a variation in solvent systems may not only change the speed of the reaction but also its apparent order. When carrying out the ring-opening reaction the degree of completion can be determined by the volume increase of the organic phase which holds the product. Isolation can be accomplished by normal means of separating, drying and removal of the solvent.

The ratio in which the reactants are used in the reaction of ethylenimine and the aryl or alkyl sulfonyl chloride in the preliminary reaction is not critical, but for maximum yield it is preferred that for each mole of sulfonyl chloride there is used an equivalent mole of ethylenimine and mole of acid acceptor. Although the reaction will occur at almost any mole ratio of reactants, an excess of ethylenimine will result in a competing reaction with the dithiophosphate salt or acid which then results in undesirable by products and lowers the ultimate yield and quality of dithiophosphorylethyl aryl or alkyl sulfonamide. Slight excesses of ethylenimine, 2 to 5 percent, or of the sulfonyl chloride, 2 to 5 percent, will have little or no effect on quality. The use of other than inorganic caustic sources was found to produce inferior results.

The temperature at which the initial reaction of ethylenimine and the sulfonyl chloride is conducted affects the quality of the final product. Therefore, it is desirable to conduct this phase of the reaction at as low a temperature as possible. The temperature range found most satisfactory is between about −5° C. and about +25° C., although higher temperatures are allowed with a sacrifice of final product quality. In carrying out the reaction the reactants are mixed together with adequate stirring over a period of from about 15 minutes to about 3 hours at the desired temperature.

To the above-described reaction mass can be added either an aqueous solution of an alkali metal or ammonium dialkyldithiophosphate salt or the corresponding free acid. The corresponding free acid also can be used with or without a polar solvent. The ratio of salt or acid to sulfonylethylenimine is not critical, although it is preferred to use at least a mole to mole ratio of reactants. Particularly it is preferred to use a slight excess of the phosphorus-containing salt or acid. The temperature of the reaction mass increases slightly due to the heat of reaction. The reaction will proceed at almost over a wide temperature range, however, it is preferred to maintain the temperature at about 70° C. where the reaction will proceed at a more rapid rate. This elevated temperature allows the completion of the ethylenimine ring-opening and condensation with the dithiophosphoryl salt or dithiophosphate acid to take place within approximately 15 minutes. To complete the process the reaction products are then cooled and the pH adjusted to near neutral (pH 7–8) before phase separation and subsequent product recovery.

The condensation of ethylenimine with benzene sulfonyl chloride in the presence of an acid acceptor is known in the prior art. However, the condensation reactions of resulting sulfonylethylenimines and substituted-dithiophosphoric acids or its salts are new and novel. Thereby, the ring-opening reactions indicated in the embodiments of the present invention, as herein stated, clearly constitute an invention resulting in a new and improved process for the preparation of N-(beta-dialkyldithiophosphorylethyl) aryl or alkyl sulfonamides.

The following non-limiting examples illustrate the process of this invention.

Example 1

Into a glass reactor was charged 21.5 g. (0.5 mole) of ethylenimine and 340 ml. of toluene. The reactor was cooled to 0 to −5° C. and then 79.5 g. (0.5 mole) of 25 percent sodium hydroxide was added. To the stirred solution was added over a 3-hour period 88.3 g. (0.5 mole) of benzenesulfonylchloride. After the addition was completed the reaction was allowed to stir for an additional ten minutes, and the temperature was allowed to rise to 10° C. A 45.7 percent aqueous solution of sodium di- isopropyldithiophosphate (302 g., 0.6 mole) was added to the reactor and the temperature raised to 70° C. The reaction mixture was held at this temperature for 15 minutes, then cooled to 45° C. and neutralized with hydrochloric acid to a pH of about 7 to 8. The aqueous phase was separated and the organic phase washed two times with water at 45° C. The organic solvent was removed by vacuum distillation. There was obtained 191.4 g. (96.4 percent yield) of N-($\beta$-diisopropyldithiophosphorylethyl) benzene sulfonamide. The purity by paper chromatography was 96 percent.

Example 2

In the same manner as Example 1, benzenesulfonylethylenimine was prepared. To this solution was added 143 g. (0.6 mole) of diisopropyldithiophosphoric acid that contained 11 percent free isopropanol. The temperature rose to approximately 50° C. due to the heat of reaction. This temperature was held for fifteen minutes and then increased to 70° C. for two to fifteen minutes. Into the reactor was introduced 100 ml. of cold water and the material cooled to 45–50° C. The contents of the reactor were neutralized with caustic to a pH 7 to 8. After phase separation the organic phase was washed with water and the solvent removed in vacuo. There was obtained 198.0 g. of N-($\beta$-diisopropyldithiophosphorylethyl) benzene sulfonamide. The purity as analyzed by paper chromatography was 99.5 percent.

Various changes and modifications may be made in the process described herein as will be apparent to those skilled in the chemical arts. It is accordingly intended that the present invention only be limited by the scope of the appended claims.

We claim:

1. A process for the preparation of N-(beta-diloweralkyldithiophosphorylethyl) aryl and alkyl sulfonamides, comprising reacting a member selected from the group consisting of N-arylsulfonyl- and N-alkylsulfonylethylenimine with a member selected from the group consisting of diloweralkyldithiophosphoric acid, and aqueous solutions of alkali metal and ammonium diloweralkyldithiophosphates, and isolating the material produced thereby.

2. A process for the preparation of N-(beta-diisopropyldithiophosphorylethyl) benzene sulfonamide, comprising reacting N-benzenesulfonyl ethylenimine with diisopropyldithiophosphoric acid and isolating the material produced thereby.

3. A process for the preparation of N-(beta-diisopropyldithiophosphorylethyl) benzene sulfonamide, comprising reacting N-benzenesulfonyl ethylenimine with an aqueous solution of sodium diisopropyldithiophosphate and isolating the material produced thereby.

4. A process for the preparation of N-(beta-diisopropyldithiophosphorylethyl)benzene sulfonamide, comprising reacting N-benzenesulfonyl ethylenimine with an aqueous solution of a compound selected from the group consisting of (1) sodium diisopropyldithiophosphate, (2) potassium diisopropyldithiophosphate, and (3) ammonium diisopropyldithiophosphate and isolating the material produced thereby.

5. A process for the preparation of N-(beta-diloweralkyldithiophosphorylethyl) aryl and alkyl sulfonamides, comprising reacting a mole of member selected from the group consisting of N-arylsulfonyl- and N-alkylsulfonylethylenimine with about a mole of a member selected from the group consisting of diloweralkyldithiophosphoric acid and aqueous solutions of alkali metal and ammonium diloweralkyldithiophosphates, and isolating the materials produced thereby.

6. A process for the preparation of N-(beta-diisopropyldithiophosphorylethyl)benzene sulfonamide, comprising reacting a mole of N-benzenesulfonyl ethylenimine with about a mole of diisopropyldithiophosphoric acid and isolating the material produced thereby.

7. A process for the preparation of N-(beta-diisopropyldithiophorylethyl)benzene sulfonamide, comprising reacting a mole of N-benzenesulfonyl ethylenimine with slightly more than a mole of diisopropyl dithiophosphoric acid and isolating the material produced thereby.

8. A process for the preparation of N-(beta-diisopropyldithiophosphorylethyl)benzene sulfonamide comprising reacting a mole of N-benzenesulfonyl ethylenimine with an aqueous solution of about a mole of a compound selected from the group consisting of (1) sodium diisopropyldithiophosphate, (2) potassium diisopropyldithiophosphate, and (3) ammonium diisopropyldithiophoshate and isolating the material produced thereby.

9. The process of claim 8 wherein said compound is sodium diisopropyldithiophosphate.

10. A process for the prepaartion of N-(beta-diisopropylidithiophosphorylethyl)benzene sulfonamide comprising reacting a mole of N-benzenesulfonylethylenimine with an aqueous solution of slightly more than a mole of sodium diisopropyldithiophosphate and isolating the material produced thereby.

References Cited

UNITED STATES PATENTS 2,785,191   3/1957   Schwyzer _____ 260—239

CHARLES B. PARKER, *Primary Examiner.*

B. BILLIAN, A. H. SUTTO, *Assistant Examiners.*